United States Patent
Batts (10) Patent No.: US 10,649,846 B2
(45) Date of Patent: May 12, 2020

(54) DISASSEMBLY AND REASSEMBLY OF A TAR ARCHIVE

(71) Applicant: Red Hat, Inc., Raleigh, NC (US)

(72) Inventor: Vincent Batts, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 908 days.

(21) Appl. No.: 15/042,845

(22) Filed: Feb. 12, 2016

(65) Prior Publication Data
US 2017/0235741 A1 Aug. 17, 2017

(51) Int. Cl.
*G06F 11/14* (2006.01)
*G06F 11/10* (2006.01)
*G06F 16/11* (2019.01)

(52) U.S. Cl.
CPC .......... *G06F 11/14* (2013.01); *G06F 11/1004* (2013.01); *G06F 11/1474* (2013.01); *G06F 16/113* (2019.01)

(58) Field of Classification Search
CPC ........... G06F 17/30073; G06F 17/3007; G06F 17/30091; G06F 17/3012; G06F 3/0643; G06F 11/1474; G06F 2221/2107; G06F 16/1865; G06F 16/113
See application file for complete search history.

(56) References Cited

U.S. PATENT DOCUMENTS

| | | | |
|---|---|---|---|
| 7,346,904 B2 | 3/2008 | Fisher et al. | |
| 7,533,422 B2 | 5/2009 | Matthews et al. | |
| 7,546,305 B2 | 6/2009 | Sathyanarayan | |
| 7,689,599 B1* | 3/2010 | Shah | G06F 11/1471 707/694 |
| 7,797,279 B1 | 9/2010 | Starling et al. | |
| 7,904,437 B2 | 3/2011 | Palapudi et al. | |
| 8,275,750 B2 | 9/2012 | Bhandiwad et al. | |
| 8,438,136 B2 | 5/2013 | Ohr et al. | |
| 2008/0109498 A1* | 5/2008 | Bhandiwad | G06F 16/113 |
| 2014/0046909 A1* | 2/2014 | Patiejunas | G06F 17/30289 707/687 |

OTHER PUBLICATIONS

Author Unknown, "Build scripts for the Tor Browser Bundle," Tor, Date Accessed: Feb. 12, 2016, 1 page, https://gitweb.torproject.org/builders/tor-browser-bundle.git/tree/gitian/build-helpers/dtar.sh?id=681b1598bbbb0704f620bc0e27624a46d6f51f89.

Author Unknown, "docker deterministic ordering," docker, GitHub, committed on Feb. 5, 2015, 2 pages, https://github.com/docker/docker/commit/32d6d49.

(Continued)

*Primary Examiner* — David T. Brooks
*Assistant Examiner* — Berhanu Mitiku
(74) *Attorney, Agent, or Firm* — Withrow & Terranova, PLLC (57) ABSTRACT

Mechanisms for disassembling and reassembling a tar archive are disclosed. A computing device accesses a tar archive comprising a file payload data segment and a plurality of non-payload data segments. The non-payload data segments in the tar archive are identified. The non-payload data segments are stored in a replay log structure. The file payload data segment of a file is identified in the tar archive, and file identification data identifying the file is stored in the replay log structure. The file payload data segment is not stored in the replay log structure.

17 Claims, 6 Drawing Sheets

(56) References Cited

OTHER PUBLICATIONS

Author Unknown, "pristine-tar package in Ubuntu," Ubuntu, Canonical Ltd., Date Accessed Dec. 22, 2015, 2 pages, https://launchpad.net/ubuntu/+source/pristine-tar.

Author Unknown, "TarSum Checksum Specification," sipwise/dockerdebpkg, GitHub, Date Accessed: Dec. 22, 2015, 4 pages, https://github.com/sipwise/docker-deb-pkg/blob/master/pkg/tarsum/tarsum_spec.md.

Hess, Joey, "generating pristine tarballs from git repositories," Date Accessed: Dec. 22, 2015, 2 pages, https://ioeyh.name/blog/entry/generating_pristine_tarballs_from_git_repositories/.

* cited by examiner

DISASSEMBLY AND REASSEMBLY OF A TAR ARCHIVE

TECHNICAL FIELD

The examples relate generally to tar archives, and in particular to disassembling a tar archive and subsequently reassembling the tar archive.

BACKGROUND

Tar archives are a common way of collecting multiple data files into a single file for storage, distribution, and the like. To ensure that a tar archive has not suffered corruption or been tampered with during storage or transmission, it is common to utilize a verification function that reads the tar archive and generates original verification data based on the contents of the tar archive. An example of verification data is a checksum. The tar archive may then subsequently be distributed from the originator to a first downstream entity, along with the original verification data. The first downstream entity can receive the tar archive and then run the same verification function against the received tar archive to generate new verification data that can be compared to the original verification data. If the new verification data does not match the original verification data, it may be assumed that the tar archive that was received differs in some manner from the original tar archive, and the received tar archive may be rejected. If the new verification data does match the original verification data, the data files and raw data in the tar archive may be extracted, stored in a storage device, and then utilized as appropriate.

Subsequently, the first downstream entity may send the tar archive to a second downstream entity. The first downstream entity may either send the original copy of the tar archive received from the originator to the second downstream entity, or, may create a new tar archive from the extracted files of the original tar archive. Unfortunately, even in a situation where the extracted files may not have changed, a newly generated tar archive may not bit-for-bit match the original tar archive and thus may fail a verification test. This is because one or more pieces of information maintained in a tar archive may change over time, such as ownership of a file, access time of a file, or the like. Additionally, different tar archive generation utilities may differ slightly in exactly how they generate a tar archive, resulting in slightly different tar archives. Thus, if the first downstream entity generates a new tar archive and sends the new tar archive to the second downstream entity, the tar archive received by the second downstream entity may not bit-for-bit match the original tar archive, and thus the verification match will fail.

To eliminate this problem, an entity may retain copies of any tar archives that may need to be subsequently redistributed. Because the files in the tar archive must be extracted from the tar archive and stored on a storage device for use, the data is duplicated: the data exists in the copy of the tar archive, and the data exists on a storage device as separate files. This duplication of data wastes computer storage and may increase the processing requirements of other computer processes, such as a backup process that backs up the storage device.

SUMMARY

The examples relate to the disassembly of a tar archive into a substantially smaller replay log structure from which a tar archive copy can subsequently be generated that bit-for-bit matches the tar archive. A verification process run against both the tar archive and the tar archive copy will generate the same verification data because the tar archive and the tar archive copy are identical. Among other features, the examples eliminate a need to retain a copy of the tar archive in order to subsequently distribute the tar archive, saving disk space and other computing resources.

In one example, a method is provided. A computing device accesses a tar archive comprising a file payload data segment and a plurality of non-payload data segments. The non-payload data segments in the tar archive are identified. The non-payload data segments are stored in a replay log structure. The file payload data segment of a file is identified in the tar archive, and file identification data identifying the file is stored in the replay log structure. The file payload data segment is not stored in the replay log structure.

In one example, the method further includes generating a payload data validation value based on the file payload data segment of the file and storing the payload data validation value in the replay log structure.

In one example, the file identification data includes a name of the file and a size of the file payload data segment of the file in the replay log structure.

In one example, the method further includes generating a reassembled tar archive. The method includes accessing the replay log structure and identifying the file identification data in the replay log structure. The method further includes accessing the file payload data segment of the file based on the file identification data and sending the non-payload data segments from the replay log structure in a same sequence as the non-payload data segments are arranged in the replay log structure. The method further includes sending the file payload data segment of the file in a same position with respect to the non-payload data segments as in the tar archive.

In another example, a computing device is provided. The computing device includes a memory and a processing device coupled to the memory to access a tar archive comprising a file payload data segment and a plurality of non-payload data segments. The processing device identifies the non-payload data segments in the tar archive and stores the non-payload data segments in a replay log structure. The processing device identifies the file payload data segment of a file in the tar archive, and stores file identification data identifying the file in the replay log structure, wherein the file payload data segment is not stored in the replay log structure.

In another example, another method is provided. The method includes accessing a tar archive and identifying a plurality of non-payload data segments in the tar archive interspersed with a plurality of file payload data segments, each file payload data segment comprising contents of a corresponding file stored in the tar archive. The method further includes storing the plurality of non-payload data segments in a replay log structure in a same sequential order as the plurality of non-payload data segments occurs in the tar archive. The method further includes storing file identification information for each respective file payload data segment that identifies the file corresponding to the respective file payload data segment in the replay log structure, wherein the plurality of payload data segments is not stored in the replay log structure.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first block" and "second block," and does not imply a priority, a type, an importance, or other attribute, unless otherwise stated herein.

As used herein and in the claims, the articles "a" and "an" in reference to an element refers to "one or more" of the element unless otherwise explicitly specified.

A tar archive is a structure that contains multiple data files and is typically used for storage or distribution of the files. A tar utility generates the tar archive from the desired set of files and from related information, such as file attributes of the files. The tar utility is subsequently used to extract the set of files from the tar archive so that the files can be stored individually on a storage device and used for their intended purpose. During extraction, the tar utility attempts to set file attributes of the files based on file header information contained in the tar archive. Based on permissions, file system capabilities, and the like, such attempts to set the file attributes may not always be successful, and thus the file attribute information contained in the tar archive may not be identical to the file attribute information of the files on the storage device. Accordingly, in such situations, a new tar archive generated from the files would differ from the tar archive from which the files were originally extracted.

The examples relate to the disassembly of a tar archive into a substantially smaller replay log structure from which a tar archive copy can subsequently be generated that bit-for-bit matches the tar archive. A verification process run against both the tar archive and the tar archive copy will generate the same verification data because the tar archive and the tar archive copy are identical. Among other features, the examples eliminate a need to retain a copy of the tar archive in order to subsequently distribute the tar archive, saving disk space and other computing resources.

Figure 1A:
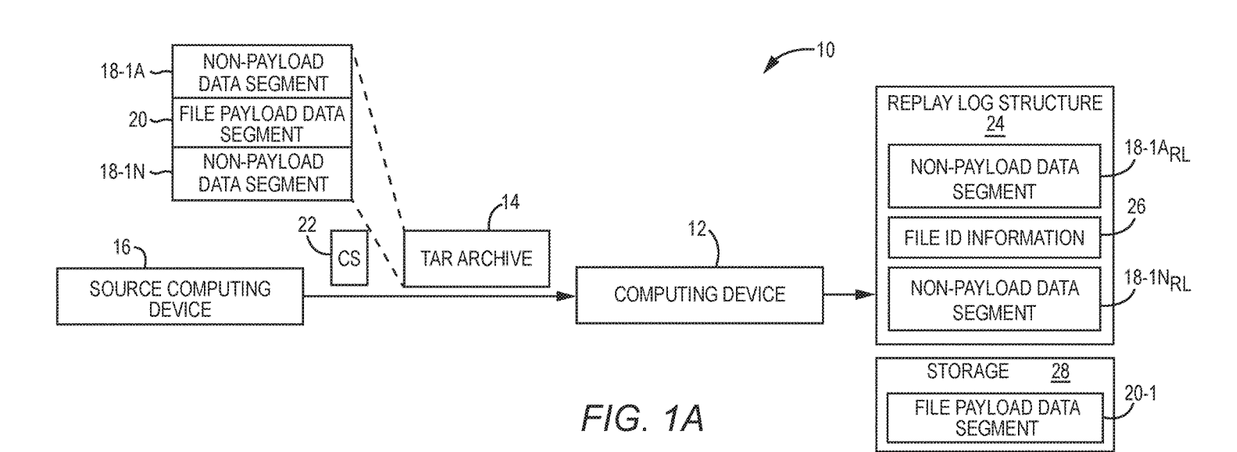
FIG. 1A is a block diagram illustrating aspects of a computing device suitable for disassembling a tar archive into a replay log structure, according to one example.

FIG. 1A is a block diagram illustrating aspects of a computing device 12 suitable for disassembling a tar archive into a replay log structure according to one example. The computing device 12 accesses a tar archive 14 generated by a source computing device 16. In some examples the source computing device 16 and the computing device 12 may be the same computing device. The phrase "tar archive" refers to a collection of one or more files maintained in a tar format. A tar archive typically has a file extension of ".tar". An example of a tar format is the ustar interchange format specified by the Open Group Base Specifications Issue 7, IEEE std 1003.1, 2013 Edition, the contents of which are incorporated herein by reference in their entirety. Generally, as will be discussed in greater detail herein, a tar format comprises a structure comprising a plurality of non-payload data segments 18-1-18-N (generally, non-payload data segments 18) and at least one file payload data segment 20 that is interspersed with the non-payload data segments 18. A tar format does not typically have an index that identifies the file payload data segments 20 in the tar archive 14, but rather the file payload data segments 20 are identified by processing the tar archive 14 sequentially from beginning to end.

The phrase "payload data" refers to the actual contents of a file contained in the tar archive 14. Payload data does not include data such as a file header of the file, but refers to the data that would be returned by an operating system if a computer process or application attempted to read the contents of the file. The phrase "payload data segment" refers to the complete payload data of a single file, irrespective of the length of the payload data. The phrase "non-payload data" refers to any data in the tar archive 14 that is not payload data. Examples of non-payload data are file headers, padding data inserted between the end of a file payload data segment 20 and a next block boundary of the tar archive 14, and end-of-archive data that indicates an end of the file payload data segments 20 in the tar archive 14.

The tar archive 14 may have an associated verification value 22, such as a checksum. The verification value 22 is derived based on the contents of the tar archive 14 and comprises a value that will differ depending on the contents of the tar archive 14. In one example, the verification value 22 comprises a checksum derived based on the contents of the tar archive 14, but the verification value 22 may be any value that may be utilized to determine whether two structures or files are identical.

The tar archive 14 may be in the form of a data file, and, to access the tar archive 14, the computing device 12 reads the tar archive 14 from a storage device (not illustrated). In other examples, the tar archive 14 may be a stream, and, to access the tar archive 14, the computing device 12 may receive a streamed tar archive 14.

The computing device 12 identifies the non-payload data segments 18-1A, 18-1N and stores bit-for-bit copies of the non-payload data segments 18-1A, 18-1N as non-payload data segments 18-1A$_{RL}$, 18-1N$_{RL}$ in a replay log structure 24. The replay log structure 24 may be maintained on a persistent storage device or in a memory of the computing device 12. Note that the non-payload data segments 18-1A$_{RL}$, 18-1N$_{RL}$ may be stored in the replay log structure 24 in a same sequence as the non-payload data segments 18-1A, 18-1N exist in the tar archive 14.

The computing device 12 also identifies the file payload data segment 20 of a file in the tar archive 14. The computing device 12 stores file identification information 26 identifying the file in the replay log structure 24. The file identification information 26 identifies the file with which the file payload data segment 20 is associated. The file identification information 26 may comprise, for example, information about the file, such as a name of the associated file and a size in bytes of the file payload data segment 20. Some or all of this information may be derived from data in a non-payload data segment 18 associated with the file, such as a file header of the file, and/or from analysis of the file payload data segment 20. The file payload data segment 20, however, is not stored in the replay log structure 24. Prior to or subsequent to the process described herein, however, a tar archive extraction program typically extracts the file payload data segment 20 from the tar archive 14 and stores the file payload data segment 20 on a persistent storage device 28 so that the file payload data segment 20 can be used for its intended purpose.

While for purposes of illustration only a single file payload data segment 20 is discussed in FIG. 1A, in practice, the tar archive 14 may contain hundreds, thousands, or even millions of files, each of which has a corresponding file payload data segment 20. Moreover, each file payload data segment 20 may be relatively large, such as kilobytes, megabytes or gigabytes in size. Because the replay log structure 24 only contains the non-payload data segments 18 and does not contain the file payload data segments 20, the replay log structure 24 may be a relatively small fraction of the size of the tar archive 14.

Figure 1B:
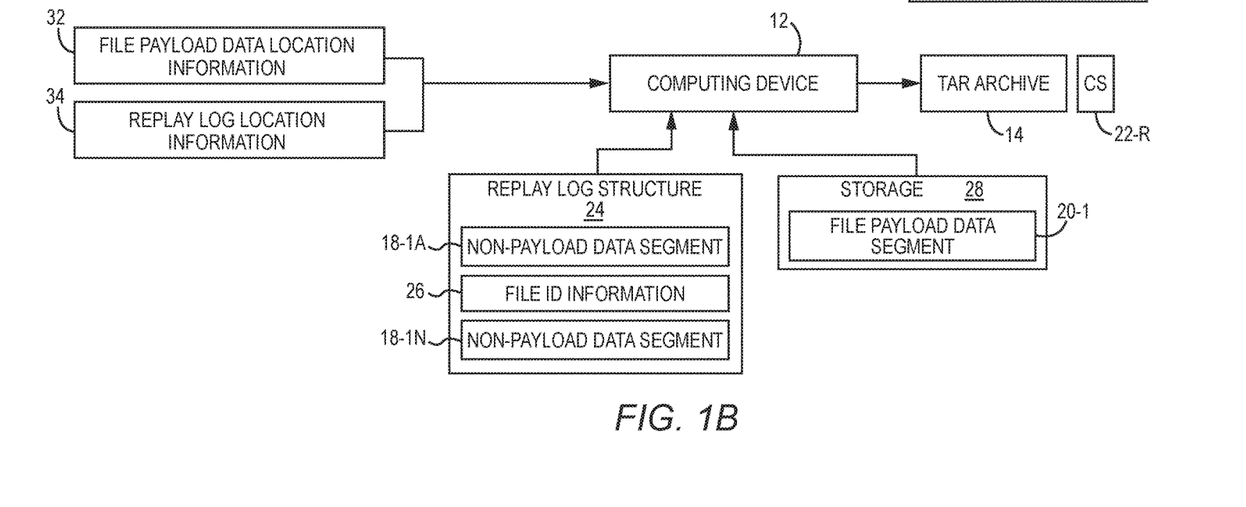
FIG. 1B is a block diagram illustrating the computing device reassembling a tar archive from the replay log structure such that the tar archive is a bit-for-bit copy, according to one example.

FIG. 1B is a block diagram illustrating the computing device 12 reassembling a tar archive 14$_{RE}$ from the replay log structure 24 such that the tar archive 14$_{RE}$ is a bit-for-bit copy of the tar archive 14, according to one example. The computing device 12 initially receives file payload data location information 32 that identifies a location of the file payload data segment 20, and replay log location information 34 that identifies a location of the replay log structure 24. In one example, the file payload data location information 32 may identify a path or folder in which the file payload data segment 20 is stored.

The computing device 12 accesses the replay log structure 24 and identifies the file identification information 26 in the replay log structure 24. The computing device 12 accesses the file payload data segment 20 of the file based on the file identification information 26. The computing device 12 sends the non-payload data segments 18-1A$_{RL}$, 18-1N$_{RL}$ from the replay log structure 24 in a same sequence as the non-payload data segments 18-1A$_{RL}$, 18-1N$_{RL}$ are arranged in the replay log structure 24 and sends the file payload data segment 20 of the file in a same position with respect to the non-payload data segments 18 as in the tar archive 14 to generate the re-assembled tar archive 14$_{RE}$. Because the tar archive 14$_{RE}$ is generated based on the non-payload data segments 18 and the file payload data segment 20 and reconstructed in the same sequence as the tar archive 14, the tar archive 14$_{RE}$ is a bit-for-bit copy of the tar archive 14. Thus, if the same verification process is performed on the tar archive 14$_{RE}$ as was performed on the tar archive 14, a verification value 22$_{RE}$ is generated that matches the verification value 22.

Figure 2:
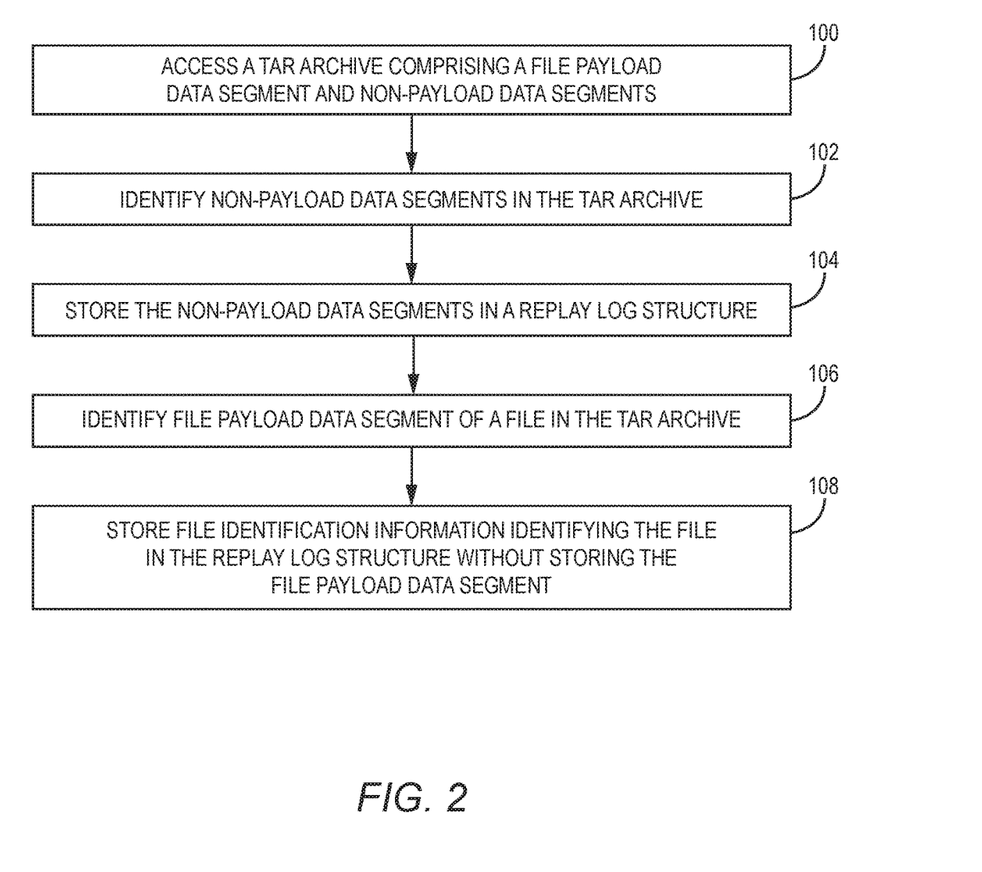
FIG. 2 is a flowchart illustrating a method for disassembling the tar archive into the replay log structure, according to one example.

FIG. 2 is a flowchart illustrating a method for disassembling the tar archive 14 into the replay log structure 24, according to one example. FIG. 2 will be discussed in conjunction with FIG. 1. The computing device 12 accesses the tar archive 14, which includes the file payload data segment 20 and the non-payload data segments 18 (block 100). The computing device 12 identifies the non-payload data segments 18 in the tar archive 14 and stores the non-payload data segments 18 in the replay log structure 24 (blocks 102-104). The computing device 12 identifies the file payload data segment 20 of a file in the tar archive 14 (block 106). The computing device 12 stores file identification information 26 identifying the file in the replay log structure 24 without storing the file payload data segment 20 (block 106).

Figure 3:
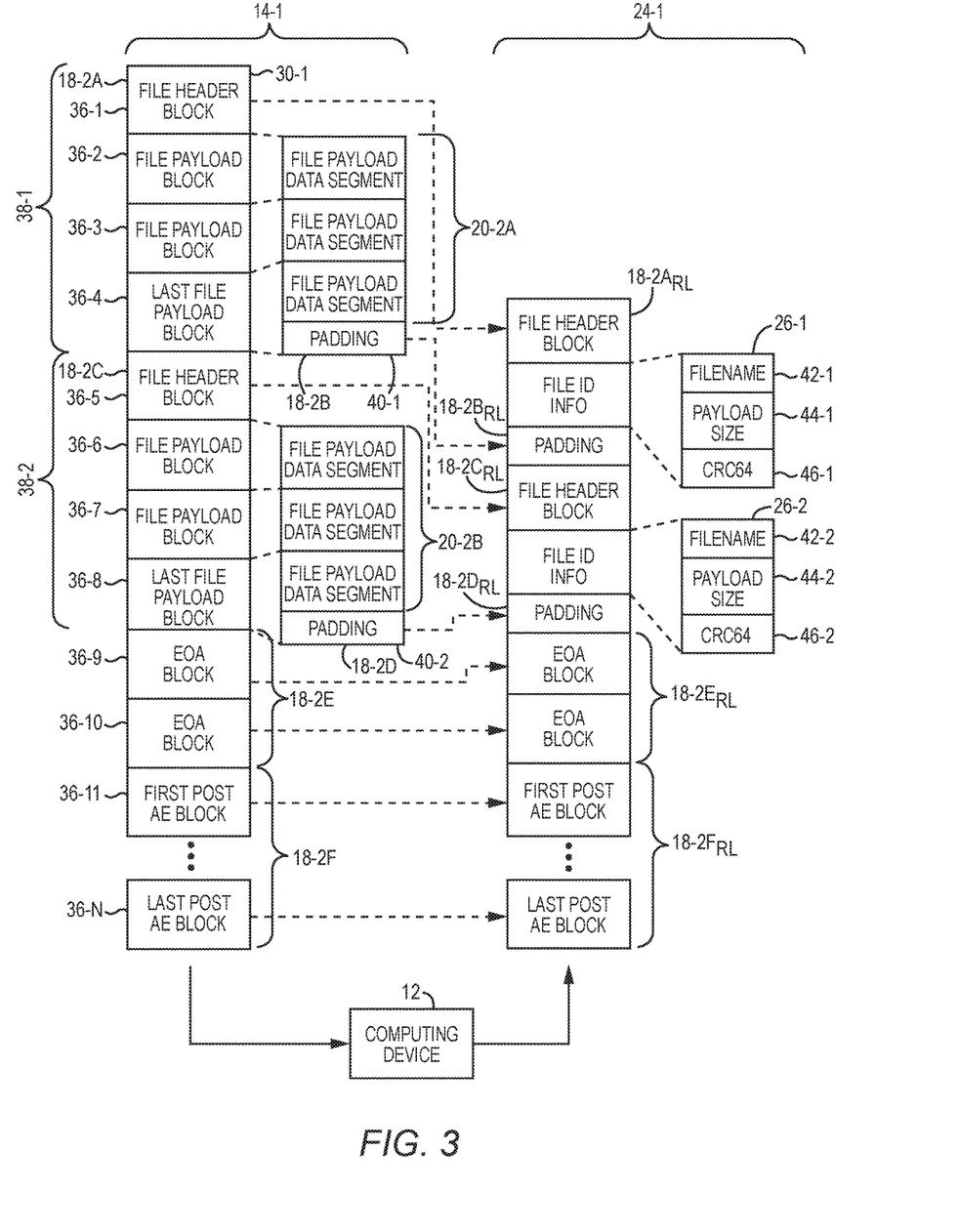
FIG. 3 is a block diagram illustrating a tar archive and a replay log structure that is generated based on the tar archive, according to another example.

FIG. 3 is a block diagram illustrating a tar archive 14-1 and a replay log structure 24-1 that is generated based on the tar archive 14-1, according to another example. In this example, the data contained in the tar archive 14-1 is organized in a plurality of data blocks 36-1-36-N (generally, blocks 36), each of which has a size of 512 bytes. The blocks 36 contain a plurality of non-payload data segments 18-2A-18-2F (generally, non-payload data segments 18-2) and a plurality of file payload data segments 20-2A-20-2B (generally, file payload data segments 20-2). Each non-payload data segment 18-2 is a consecutive series of data that is non-payload data. A non-payload data segment 18-2 may or may not start on a block boundary of the tar archive 14. Each file payload data segment 20-2 is a consecutive series of data that is payload data. A file payload data segment 20-2 typically starts on a block boundary of the tar archive 14 but may not end on a block boundary.

The initial blocks 36-1-36-4 of the tar archive 14-1 contain a file entry 38-1 associated with a first file stored in the tar archive 14-1. The first physical block 36-1 in the tar archive 14-1 in this example is a file header block of the first file contained in the tar archive 14-1. Because the block 36-1 contains file header information and not file payload data, the beginning of the block 36-1 comprises the beginning of a non-payload data segment 18-2A. The second physical block 36-2 in the tar archive 14-1 is a first block of payload data for the file identified in the block 36-1. Because the block 36-2 contains payload data, the beginning of the block 36-2 marks the end of the first non-payload data segment 18-2A and the beginning of the first file payload data segment 20-2A. The computing device 12 copies the initial non-payload data segment 18-2A to a replay log structure 24-1 as a non-payload data segment 18-2A$_{RL}$. The non-payload data segment 18-2A$_{RL}$ is a bit-for-bit copy of the non-payload data segment 18-2A.

Blocks 36-2-36-4 contain payload data of the file entry 38-1. In this example, the file payload data is greater than 1024 bytes and less than 1536 bytes, and thus occupies all of blocks 36-2 and 36-3, but only a portion of block 36-4. The remaining portion of the block 36-4 contains padding data 40-1, which is inserted by a tar utility that created the tar archive 14-1 to cause the next tar entry to begin on a block boundary. The padding data 40-1 is non-payload data and thus comprises a non-payload data segment 18-2B. The computing device 12 does not store the file payload data segment 20-2A in the replay log structure 24-1. The computing device 12 copies the non-payload data segment 18-2B to the replay log structure 24-1 as a non-payload data segment 18-2B$_{RL}$. The non-payload data segment 18-2B$_{RL}$ is a bit-for-bit copy of the non-payload data segment 18-2B.

The computing device 12 generates file identification information 26-1 and stores the file identification information 26-1 in the replay log structure 24-1. In this example, the file identification information 26-1 includes a filename 42-1 that contains the filename of the file contained in the file entry 38-1 and a payload size 44-1 that identifies the size of the file payload data segment 20-2A. The filename 42-1 may be derived, for example, from the file header information contained in the data block 36-1. In one example, the computing device 12 also processes the file payload data segment 20-2A to generate a payload data validation value 46-1 that can be used to subsequently determine whether the contents of the file payload data segment 20-2A have changed over time. In this example, the payload data validation value 46-1 comprises a 64-bit cyclic redundancy check (CRC64) value that is generated based on the contents of the file payload data segment 20-2A; however, the embodiments are not limited to any particular payload data validation value and may utilize, for example, a sha1 value, a sha256 value, a sha512 value, and the like.

Blocks 36-5-36-8 contain a file entry 38-2 associated with another file stored in the tar archive 14-1. The first block 36-5 of the file entry 38-2 is a file header block that contains meta data relating to the file associated with the file entry 38-2. Because the block 36-5 contains file header information and not file payload data, the beginning of the block 36-5 comprises the beginning of a non-payload data segment 18-2C. The second physical block 36-6 of the file entry 38-2 is a first block of file payload data for the file associated with the file entry 38-2. Because the block 36-6 contains file payload data, the beginning of the block 36-6 marks the end of the non-payload data segment 18-2C and the beginning of a file payload data segment 20-2B. The computing device 12 copies the non-payload data segment 18-2C to the replay log structure 24-1 as a non-payload data segment 18-2C$_{RL}$. The non-payload data segment 18-2C$_{RL}$ is a bit-for-bit copy of non-payload data segment 18-2C.

Blocks 36-6-36-8 contain payload data of the file entry 38-2. In this example, the file payload data is again greater than 1024 bytes and less than 1536 bytes, and thus occupies all of blocks 36-6 and 36-7, but only a portion of block 36-8. The remaining portion of the block 36-8 contains padding data 40-2 which is inserted by the tar utility that created the tar archive 14-1 to cause the next tar entry to begin on a block boundary. The padding data 40-2 is non-payload data and thus comprises a non-payload data segment 18-2D. The computing device 12 does not store the file payload data segment 20-2B in the replay log structure 24-1. The computing device 12 copies the non-payload data segment 18-2D to the replay log structure 24-1 as a non-payload data segment 18-2D$_{RL}$. The non-payload data segment 18-2D$_{RL}$ is a bit-for-bit copy of the non-payload data segment 18-2D.

The computing device 12 generates file identification information 26-2 and stores the file identification information 26-2 in the replay log structure 24-1. In this example, the file identification information 26-2 includes a filename 42-2 that contains the filename of the file contained in the file entry 38-2 and a payload size 44-2 that identifies the size of the file payload data segment 20-2B. The filename 42-2 may be derived, for example, from the file header information contained in the data block 36-5. The computing device 12 also processes the file payload data segment 20-2B to generate a payload data validation value 46-2 that can be used to subsequently determine whether the contents of the file payload data segment 20-2B have changed over time. In this example, the payload data validation value 46-2 comprises a 64-bit cyclic redundancy check (CRC64) value that is generated based on the contents of the file payload data segment 20-2B.

While for purposes of illustration only two files are discussed in this example, in practice, as discussed above, the tar archive 14-1 may contain hundreds, thousands, or millions of file entries 38, and each file entry 38 would be processed in a similar manner as discussed above with regard to the file entries 38-1 and 38-2.

Blocks 36-9-36-10 comprise end-of-archive (EOA) blocks that indicate the end of the file entries 38 in the tar archive 14-1. The EOA blocks 36-9-36-10 are not file payload data and thus comprise a non-payload data segment 18-2E. The computing device 12 copies the non-payload data segment 18-2E to the replay log structure 24-1 as a non-payload data segment 18-2E$_{RL}$. The non-payload data segment 18-2E$_{RL}$ is a bit-for-bit copy of the non-payload data segment 18-2E.

In some tar archives, miscellaneous non-payload data may be stored in the tar archive after the EOA blocks 36-9-36-10. In this example, such data is located in blocks 36-11-36-N, and thus comprise a non-payload data segment 18-2F. The computing device 12 copies the non-payload data segment 18-2F to the replay log structure 24-1 as a non-payload data segment 18-2F$_{RL}$. The non-payload data segment 18-2F$_{RL}$ is a bit-for-bit copy of the non-payload data segment 18-2F.

The replay log structure 24-1 thus contains each bit of information in the tar archive 14-1 that is not file payload data of a file contained in the tar archive 14-1. Typically, a separate process capable of extracting files from the tar archive 14-1 will extract the file entries 38 from the tar archive 14-1 and store the associated file payload data segments 20-2 on a persistent storage device for subsequent use. If such file payload data segments 20-2 are executable files or are otherwise not modified over time, such file payload data segments 20-2 will be identical at a future point in time as they were when stored in the tar archive 14-1. As will be discussed in greater detail with regard to FIG. 4, if, at a future point in time it is desired to generate a new tar archive 14 that bit-for-bit matches the tar archive 14-1, and if the file payload data segments 20-2 have not changed, the examples disclosed herein can utilize the replay log structure 24-1 and the file payload data segments 20-2 to generate such a tar archive 14.

Figure 4:
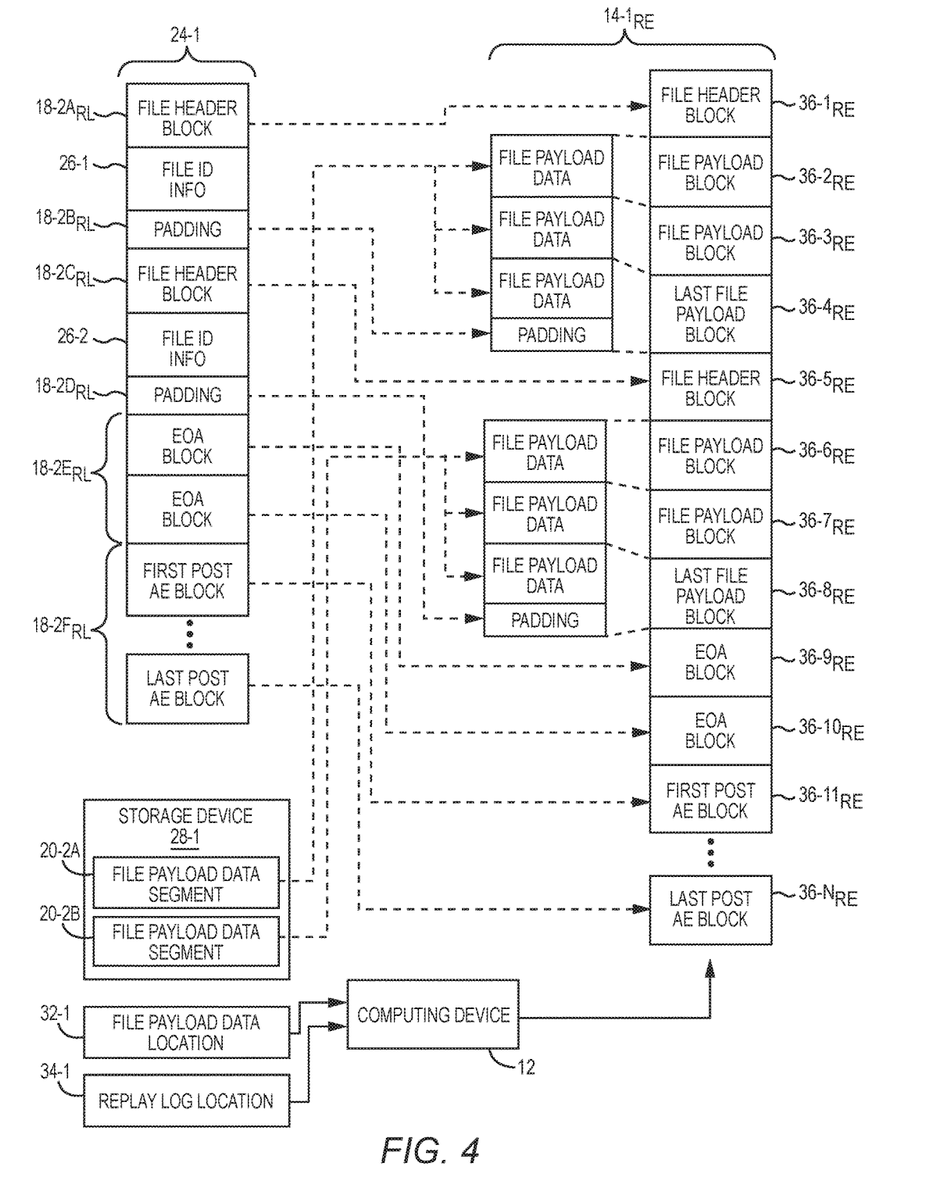
FIG. 4 is a block diagram illustrating a reassembled tar archive that is reassembled from the replay log structure and that matches the tar archive illustrated in FIG. 3, according to one example.

FIG. 4 is a block diagram illustrating a reassembled tar archive 14-1$_{RE}$ that is reassembled from the replay log structure 24-1 and that matches the tar archive 14-1 illustrated in FIG. 3, according to one example. Initially, the computing device 12 receives information such as file payload data location information 32-1 that identifies a location of the file payload data segments 20-2, and replay log location information 34-1 that identifies a location of the replay log structure 24-1. In one example, the file payload data location information 32-1 may identify a path or folder on a storage device 28-1 in which the file payload data segments 20-2 are stored.

The process described herein will generate the reassembled tar archive 14-1$_{RE}$. The tar archive 14-1$_{RE}$ may be written to a persistent storage device and take the form of a file, or may comprise a stream of data. Thus, as the tar archive 14-1$_{RE}$ is being generated, as described below, the data may be written to a disk or communicated via a stream, but, in either event, the data in the tar archive 14-1$_{RE}$ is identical. For purposes of illustration only, the data will be described as being "stored" in the tar archive 14-1$_{RE}$, but the examples are not limited to a tar archive $14\text{-}1_{RE}$ in the form of a file and also apply to a streamed tar archive $14\text{-}1_{RE}$.

The computing device 12 accesses the replay log structure 24-1 and stores the initial non-payload data segment $18\text{-}2A_{RL}$ as a block $36\text{-}1_{RE}$ in the tar archive $14\text{-}1_{RE}$. The computing device 12 accesses the file identification information 26-1 and, based on the file payload data location information 32-1 and the filename 42-1 (FIG. 3) accesses the file payload data segment 20-2A in the storage device 28-1. In one example, the computing device 12 may process the file payload data segment 20-2A to generate a CRC64 payload data validation value. The computing device 12 compares the CRC64 payload data validation value to the payload data validation value 46-1 (FIG. 3) in the file identification information 26-1 that was previously generated based on the contents of the file payload data segment 20-2A when the replay log structure 24-1 was initially generated. If the CRC64 payload data validation value does not match the payload data validation value 46-1, the computing device 12 may halt the process of generating the tar archive $14\text{-}1_{RE}$ because a failure to match indicates that the file payload data segment 20-2A has changed. If the file payload data segment 20-2A has changed, then the tar archive $14\text{-}1_{RE}$ would not match the tar archive 14-1. The computing device 12 may also generate a message identifying the mismatch.

If the CRC64 payload data validation value matches the payload data validation value 46-1, the computing device 12 continues the process. The computing device 12 determines that the size of the file payload data segment 20-2A is not an even multiple of 512, and obtains the non-payload data segment $18\text{-}2B_{RL}$ (padding data) from the replay log structure 24-1. The computing device 12 stores the file payload data segment 20-2A and the non-payload data segment $18\text{-}2B_{RL}$ as blocks $36\text{-}2_{RE}\text{-}36\text{-}4_{RE}$ in the tar archive $14\text{-}1_{RE}$.

The computing device 12 accesses the replay log structure 24-1 and stores the non-payload data segment $18\text{-}2C_{RL}$ as a block $36\text{-}5_{RE}$ in the tar archive $14\text{-}1_{RE}$. The computing device 12 accesses file identification information 26-2 and, based on the file payload data location information 32-1 and the filename 42-2 (FIG. 3), accesses the file payload data segment 20-2B in the storage device 28-1. Again, the computing device 12 may process the file payload data segment 20-2B to generate a CRC64 payload data validation value and ensure that the CRC64 payload data validation value matches the payload data validation value 46-2 (FIG. 3) prior to continuing.

If the CRC64 payload data validation value matches the payload data validation value 46-2, the computing device 12 continues the process. The computing device 12 determines that the size of the file payload data segment 20-2B is not an even multiple of 512, and obtains the non-payload data segment $18\text{-}2D_{RL}$ (padding data) from the replay log structure 24-1. The computing device 12 stores the file payload data segment 20-2B and the non-payload data segment $18\text{-}2D_{RL}$ as blocks $36\text{-}6_{RE}\text{-}36\text{-}8_{RE}$ in the tar archive $14\text{-}1_{RE}$.

The computing device 12 accesses the replay log structure 24-1 and identifies the non-payload data segment $18\text{-}2E_{RL}$ as the end-of-archive blocks of the tar archive 14-1 and stores the non-payload data segment $18\text{-}2E_{RL}$ as blocks $36\text{-}9_{RE}\text{-}36\text{-}10_{RE}$ in the tar archive $14\text{-}1_{RE}$. The computing device 12 accesses the replay log structure 24-1 and obtains the non-payload data segment $18\text{-}2F_{RL}$, which constitutes post-EOA data, and stores the non-payload data segment $18\text{-}2F_{RL}$ as blocks $36\text{-}11_{RE}\text{-}36\text{-}N_{RE}$ in the tar archive $14\text{-}1_{RE}$.

The tar archive $14\text{-}1_{RE}$ is an exact bit-for-bit match with the tar archive 14-1. Thus, a verification function that processes the tar archive 14-1 and generates verification data, such as a checksum, will generate the exact same checksum when processing the tar archive $14\text{-}1_{RE}$. Thus, the tar archive $14\text{-}1_{RE}$ was perfectly recreated without having to maintain a copy of the tar archive 14-1 in a persistent storage device.

Figure 5:
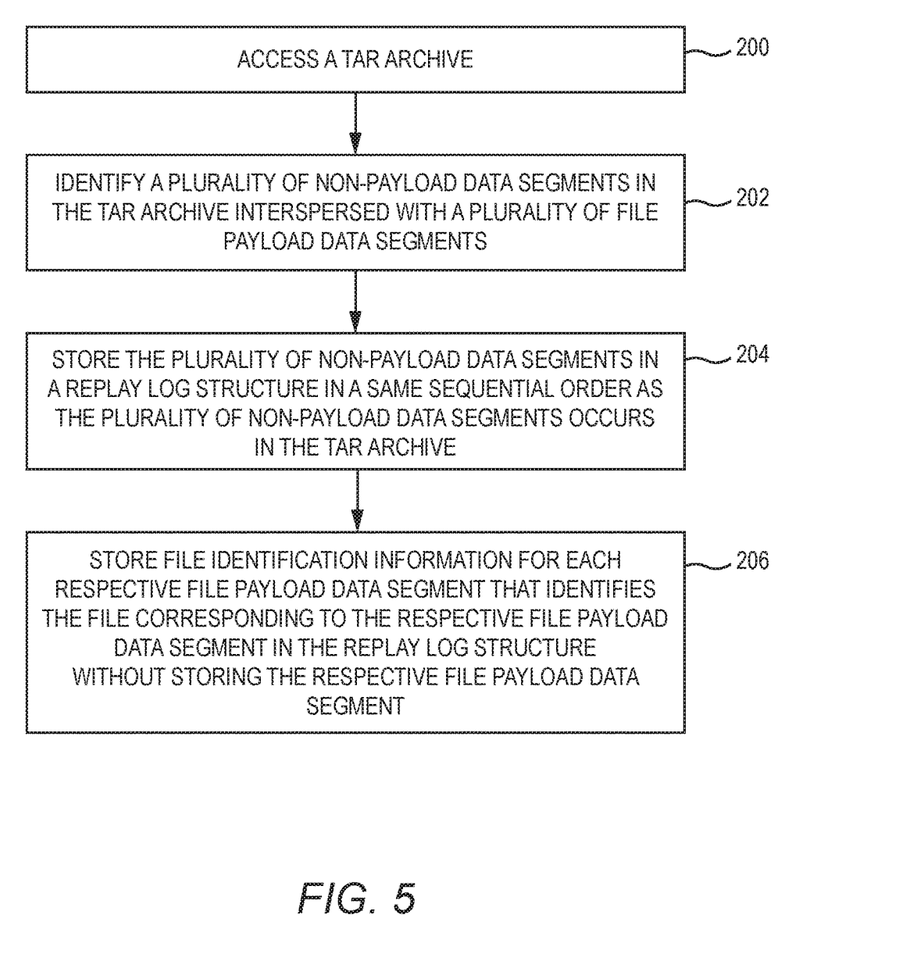
FIG. 5 is a method for generating a replay log structure, according to another example.

FIG. 5 is a method for generating a replay log structure according to another example. FIG. 5 will be discussed in conjunction with FIG. 3. Initially, the computing device 12 accesses the tar archive 14-1 (block 200). The computing device 12 identifies the plurality of non-payload data segments 18-2 in the tar archive 14-1 interspersed with the plurality of file payload data segments 20-2, wherein each file payload data segment 20-2 comprises contents of a corresponding file stored in the tar archive 14-1 (block 202). The computing device 12 stores the plurality of non-payload data segments 18-2 in the replay log structure 24-1 in a same sequential order as the plurality of non-payload data segments 18-2 occurs in the tar archive 14-1 (block 204). The computing device 12 stores file identification information 26 for each respective file payload data segment 20-2 that identifies the file corresponding to the respective file payload data segment 20-2 in the replay log structure 24-1, but does not store the plurality of file payload data segments 20-2 in the replay log structure 24-1 (block 206).

Figure 6:
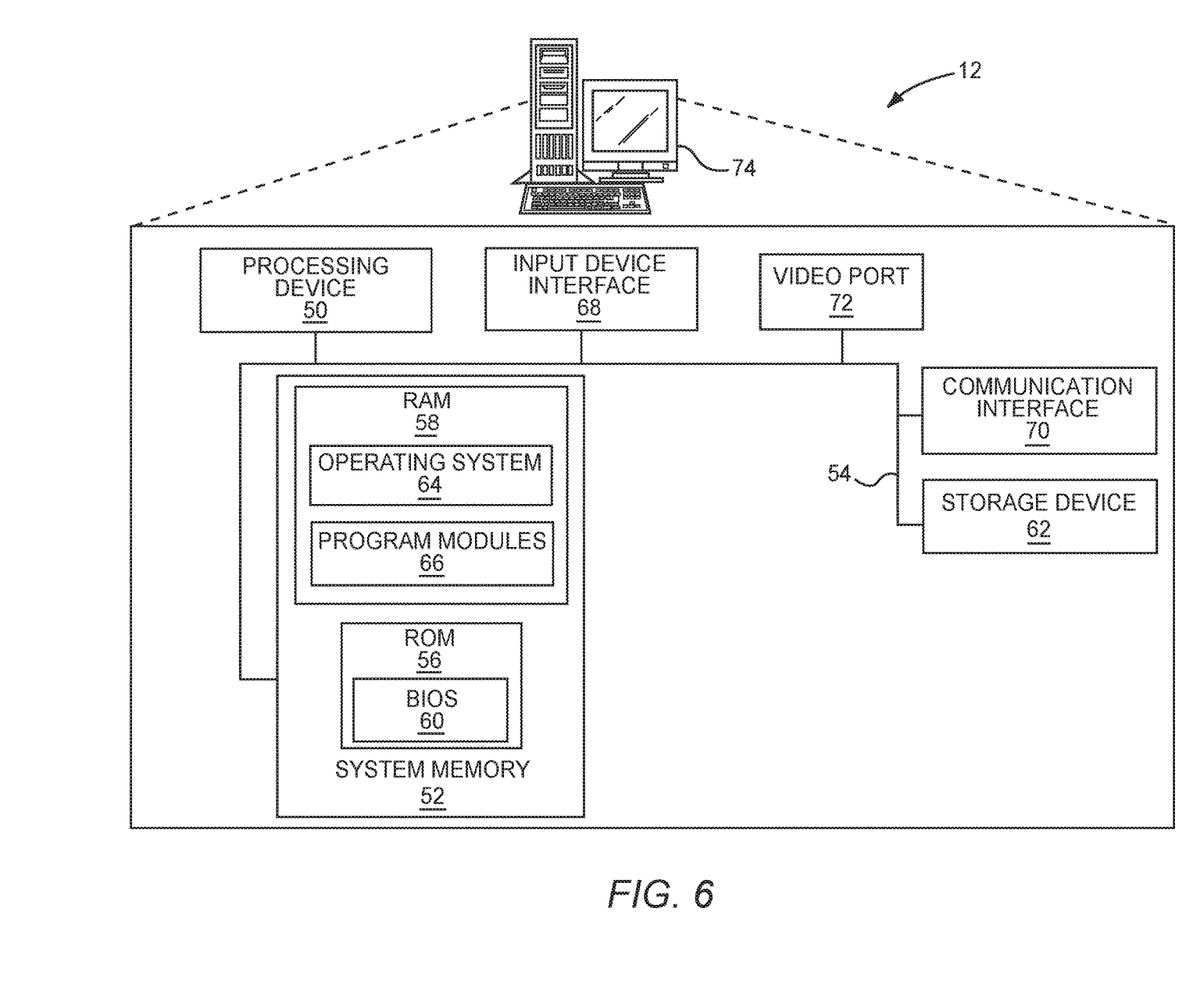
FIG. 6 is a block diagram of a computing device suitable for implementing the examples, according to one example.

FIG. 6 is a block diagram of the computing device 12 suitable for implementing examples according to one example. The computing device 12 may comprise any computing or processing device capable of including firmware, hardware, and/or executing software instructions to implement the functionality described herein, such as a computer server, a desktop computing device, a laptop computing device, or the like. The computing device 12 includes a processing device 50, a system memory 52, and a system bus 54. The system bus 54 provides an interface for system components including, but not limited to, the system memory 52 and the processing device 50. The processing device 50 can be any commercially available or proprietary processor.

The system bus 54 may be any of several types of bus structures that may further interconnect to a memory bus (with or without a memory controller), a peripheral bus, and/or a local bus using any of a variety of commercially available bus architectures. The system memory 52 may include non-volatile memory 56 (e.g., read-only memory (ROM), erasable programmable read-only memory (EPROM), electrically erasable programmable read-only memory (EEPROM), etc.), and/or volatile memory 58 (e.g., random-access memory (RAM)). A basic input/output system (BIOS) 60 may be stored in the non-volatile memory 56 and can include the basic routines that help to transfer information between elements within the computing device 12. The volatile memory 58 may also include a high-speed RAM, such as static RAM, for caching data.

The computing device 12 may further include or be coupled to a computer-readable storage device 62, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 62 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 62 and in the volatile memory 58, including an operating system 64 and one or more program modules 66, which may implement the functionality described herein in whole or in part, including, for example, the identification of the non-payload data segments in the tar archive, storing the non-payload data segments in the replay log structure, identifying the file payload data segment of a file in the tar archive, and the like. It is to be appreciated that the examples can be implemented with various commercially available operating systems 64 or combinations of operating systems 64.

All or a portion of the examples may be implemented as a computer program product stored on a transitory or non-transitory computer-usable or computer-readable storage medium, such as the storage device 62, which includes complex programming instructions, such as complex computer-readable program code, configured to cause the processing device 50 to carry out the steps described herein. Thus, the computer-readable program code can comprise software instructions for implementing the functionality of the examples described herein when executed on the processing device 50. The processing device 50, in conjunction with the program modules 66 in the volatile memory 58, may serve as a controller, or control system, for the computing device 12 that is configured to, or adapted to, implement the functionality described herein.

An operator or other user may also be able to enter one or more configuration commands through a keyboard (not illustrated), a pointing device such as a mouse (not illustrated), or a touch-sensitive surface (not illustrated). Such input devices may be connected to the processing device 50 through an input device interface 68 that is coupled to the system bus 54 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communication interface 70 suitable for communicating with a network as appropriate or desired. The computing device 12 may also include a video port 72 configured to interface with a display 74, to provide the operator or user information during the examples disclosed herein.

Individuals will recognize improvements and modifications to the examples of the disclosure. All such improvements and modifications are considered within the scope of the concepts disclosed herein and the claims that follow.

What is claimed is:

1. A method for generating a replay log structure comprising:
    accessing, by a computing device comprising a processor, a tar archive comprising a file payload data segment and a plurality of non-payload data segments;
    identifying the plurality of non-payload data segments in the tar archive;
    storing the plurality of non-payload data segments in a replay log structure;
    identifying the file payload data segment of a file in the tar archive;
    storing file identification data identifying the file in the replay log structure, wherein the file payload data segment is not stored in the replay log structure;
    generating a payload data validation value based on the file payload data segment of the file;
    storing the payload data validation value in the replay log structure; and
    generating a reassembled tar archive by:
        accessing the file payload data segment of the file based on the file identification data;
            sending the plurality of non-payload data segments from the replay log structure in a same sequence as the plurality of non-payload data segments are arranged in the replay log structure; and
            sending the file payload data segment of the file in a same position with respect to the plurality of non-payload data segments as in the tar archive.

2. The method of claim 1, wherein the payload data validation value comprises a 64-bit cyclic redundancy check (CRC) value.

3. The method of claim 1, wherein storing the file identification data identifying the file in the replay log structure without storing the file payload data segment comprises storing a name of the file and a size of the file payload data segment of the file in the replay log structure.

4. The method of claim 1, wherein a first non-payload data segment of the plurality of non-payload data segments comprises header data associated with the file.

5. The method of claim 4, wherein a second non-payload data segment of the plurality of non-payload data segments comprises padding data located between an end of the file payload data segment and a next block boundary of the tar archive.

6. The method of claim 5, wherein a third non-payload data segment of the plurality of non-payload data segments comprises end-of-archive data located after a last file in the tar archive.

7. The method of claim 6, wherein the file payload data segment comprises contents of the file.

8. The method of claim 1, wherein the tar archive is organized in 512-byte blocks.

9. The method of claim 1, wherein accessing the tar archive comprises receiving a streamed tar archive.

10. The method of claim 1, wherein accessing the tar archive comprises reading the tar archive from a storage device.

11. The method of claim 1, wherein storing the plurality of non-payload data segments in the replay log structure comprises storing the plurality of non-payload data segments in the replay log structure in a same sequence as the plurality of non-payload data segments exist in the tar archive.

12. The method of claim 1, further comprising:
    receiving file payload data location information and replay log location information, and wherein accessing the replay log structure comprises accessing the replay log structure based on the replay log location information, and wherein accessing the file payload data segment of the file based on the file identification data comprises accessing the file payload data segment of the file based on the file identification data and on the file payload data location information.

13. The method of claim 1, wherein sending the plurality of non-payload data segments from the replay log structure in the same sequence as the plurality of non-payload data segments is arranged in the replay log structure comprises writing the plurality of non-payload data segments from the replay log structure in the same sequence as the plurality of non-payload data segments is arranged in the replay log structure to a storage device.

14. The method of claim 1, wherein sending the plurality of non-payload data segments from the replay log structure in the same sequence as the plurality of non-payload data segments is arranged in the replay log structure comprises streaming the plurality of non-payload data segments from the replay log structure in the same sequence as the plurality of non-payload data segments is arranged in the replay log structure to a downstream receiver.

15. The method of claim 1, further comprising:
retrieving, from the replay log structure, the payload data validation value associated with the file;
generating, based on the file payload data segment, a new payload data validation value; and
determining that the payload data validation value matches the new payload data validation value.

16. A computing device, comprising:
a memory;
a processing device coupled to the memory to:
access a tar archive comprising a file payload data segment and a plurality of non-payload data segments;
identify the plurality of non-payload data segments in the tar archive;
store the plurality of non-payload data segments in a replay log structure;
identify the file payload data segment of a file in the tar archive;
store file identification data identifying the file in the replay log structure, wherein the file payload data segment is not stored in the replay log structure;
generate a payload data validation value based on the file payload data segment of the file; and
store the payload data validation value in the replay log structure; and
generate a reassembled tar archive by:
access the file payload data segment of the file based on the file identification data;
send the plurality of non-payload data segments from the replay log structure in a same sequence as the plurality of non-payload data segments are arranged in the replay log structure; and
send the file payload data segment of the file in a same position with respect to the plurality of non-payload data segments as in the tar archive.

17. A method, comprising:
accessing a tar archive;
identifying a plurality of non-payload data segments in the tar archive interspersed with a plurality of file payload data segments, each file payload data segment comprising contents of a corresponding file stored in the tar archive;
storing the plurality of non-payload data segments in a replay log structure in a same sequential order as the plurality of non-payload data segments occurs in the tar archive;
storing file identification information for each respective file payload data segment that identifies the file corresponding to the respective file payload data segment in the replay log structure, wherein the plurality of file payload data segments is not stored in the replay log structure;
generating, for each respective file payload data segment of the plurality of file payload data segments, a payload data validation value based on the respective file payload data segment;
storing each payload data validation value in the replay log structure; and
generating a reassembled tar archive by:
accessing the file payload data segment of the file based on the file identification data;
sending the plurality of non-payload data segments from the replay log structure in a same sequence as the plurality of non-payload data segments are arranged in the replay log structure; and
sending the file payload data segment of the file in a same position with respect to the plurality of non-payload data segments as in the tar archive.

* * * * *